United States Patent
Yoshimoto et al.

(10) Patent No.: US 6,970,705 B2
(45) Date of Patent: Nov. 29, 2005

(54) MULTIPOINT COMMUNICATION SYSTEM AND MULTIPOINT COMMUNICATION METHOD

(75) Inventors: Morio Yoshimoto, Tokyo (JP); Shuu Murayama, Tokyo (JP); Yuuji Horii, Tokyo (JP); Susumu Oka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 445 days.

(21) Appl. No.: 10/204,209

(22) PCT Filed: Dec. 26, 2001

(86) PCT No.: PCT/JP01/11474

§ 371 (c)(1),
(2), (4) Date: Aug. 19, 2002

(87) PCT Pub. No.: WO02/054747

PCT Pub. Date: Jul. 11, 2002

(65) Prior Publication Data

US 2003/0093700 A1 May 15, 2003

(30) Foreign Application Priority Data

Dec. 27, 2000 (JP) ........................ 2000-398093

(51) Int. Cl.⁷ .............................. H04Q 7/20; H04L 9/00
(52) U.S. Cl. ................................. 455/435.2; 455/435.3; 455/410; 455/411; 455/26.1; 713/202; 370/260; 370/261; 370/263
(58) Field of Search ........................ 455/435.2, 425.3, 455/410, 411, 26.1; 713/202; 370/260, 261, 263

(56) References Cited

U.S. PATENT DOCUMENTS 5,680,392 A * 10/1997 Semaan ...................... 370/261
5,930,238 A * 7/1999 Nguyen ....................... 370/260
6,295,457 B1 * 9/2001 Narayanaswamy ......... 455/466

FOREIGN PATENT DOCUMENTS

| JP | 5-145645 A | 6/1993 |
| JP | 11-164054 A | 6/1999 |
| JP | 11-212995 A | 8/1999 |
| JP | 2000-40112 A | 2/2000 |
| JP | 2000-299739 A | 10/2000 |

OTHER PUBLICATIONS

Telecommunication, vol. 17, No. 5, pp.83–85 (2000). No month Listed.

* cited by examiner

Primary Examiner—Lester G. Kincaid
Assistant Examiner—Khai Nguyen
(74) Attorney, Agent, or Firm—Birch, Stewart, Kolasch & Birch, LLP

(57) ABSTRACT

When a service receiving server 1 receives a request of a multi-point communication service from communication terminals 3A to 3C, a service ID corresponding to the multi-point communication service and passwords are respectively sent to the communication terminals 3A to 3C receiving the multi-point communication service and are sent to a communication service unit 2. When the communication service unit 2 receives the service ID and the password from the communication terminals 3A to 3C, the communication service unit 2 collates whether or not the service ID and the password sent from the communication terminals 3A to 3C agree with those sent from the service receiving server 1. In case of the agreement, the communication service unit 2 connects with the group of communication terminals 3A to 3C and provides the multi-point communication service for the communication terminals 3A to 3C according to the service ID.

12 Claims, 6 Drawing Sheets

MULTIPOINT COMMUNICATION SYSTEM AND MULTIPOINT COMMUNICATION METHOD

This application is the national phase under 35 U.S.C. § 371 of PCT International Application No. PCT/JP01/11474 which has an International filing date of Dec. 26, 2001, which designated the United States of America.

TECHNICAL FIELD

The present invention relates to a multi-point communication system and a multi-point communication method for providing various types of multi-point communication services.

BACKGROUND ART

A conventional communication reservation system is, for example, disclosed in Published Unexamined Japanese Patent Application No. H11-212995 (1999). In this communication reservation system, a reservation of the provision of a communication service is performed for each user's terminal, and a communication service is provided for the user.

In the conventional communication reservation system, when detailed information of a terminal telephone is registered to reserve a communication service, each user performs an operation of the registration of detailed information of the terminal telephone by using his or her terminal.

As is described above, in the conventional communication reservation system, because it is required of each user to perform the registration operation, when a reservation of the multi-point simultaneous communication service, for example a reservation of a multi-point television conference, is performed by users, it is required of the users to perform a large number of registration operations of telephone numbers of user's terminal telephones. Therefore, a problem has arisen that it is troublesome for the users to perform the reservation of the multi-point simultaneous communication service.

The present invention is provided to solve the above-described problem, and the object of the present invention is to provide a multi-point communication system and a multi-point communication method in which a reservation of a multi-point communication service is simplified to heighten the convenience of the reservation for users.

DISCLOSURE OF THE INVENTION

A multi-point communication system according to the present invention includes a service receiving unit for receiving a request of a type of multi-point communication service from a single communication terminal or a plurality of communication terminals, issuing both a service identifier corresponding to the type of multi-point communication service and a password corresponding to a communication terminal group receiving the type of multi-point communication service to the single communication terminal or each of the communication terminals requesting the type of multi-point communication service, and outputting the service identifier and the password or the passwords to a communication service unit. The service receiving unit receives a request of a type of multi-point communication service from an arbitrary communication terminal denoting the single communication terminal or selected from among the communication terminals, the communication service unit receives the service identifier indicating the type of multi-point communication service and the password of the arbitrary communication terminal from the arbitrary communication terminal, the communication service unit confirms whether or not the password received from the arbitrary communication terminal agrees with the password of the arbitrary communication terminal output from the service receiving unit, and the communication service unit provides the type of multi-point communication service indicated by the service identifier for the arbitrary communication in a case where the password received from the arbitrary communication terminal agrees with the password output from the service receiving unit.

Therefore, a reservation operation of the multi-point communication service can be simplified, and the convenience of the multi-point communication service for users can be heightened.

A multi-point communication method according to the present invention includes the steps of receiving a request of a type of multi-point communication service from a single communication terminal or a plurality of communication terminals, issuing a password or a service identifier corresponding to a communication terminal group receiving the type of multi-point communication service to the single communication terminal or each of the communication terminals requesting the type of multi-point communication service, and providing the type of multi-point communication service for an arbitrary communication terminal denoting the single communication terminal or selected from among the communication terminals according to the password or the service identifier sent from the arbitrary communication terminal in a case where the service identifier indicating a request of the type of multi-point communication service and the password are received from the arbitrary communication terminal.

Therefore, a reservation operation of the multi-point communication service can be simplified, and the convenience of the multi-point communication service for users can be heightened.

BEST MODE FOR CARRYING OUT THE INVENTION

Hereinafter, the best mode for carrying out the present invention will now be described with reference to the accompanying drawings to explain the present invention in more detail.

Embodiment 1

Figure 1:
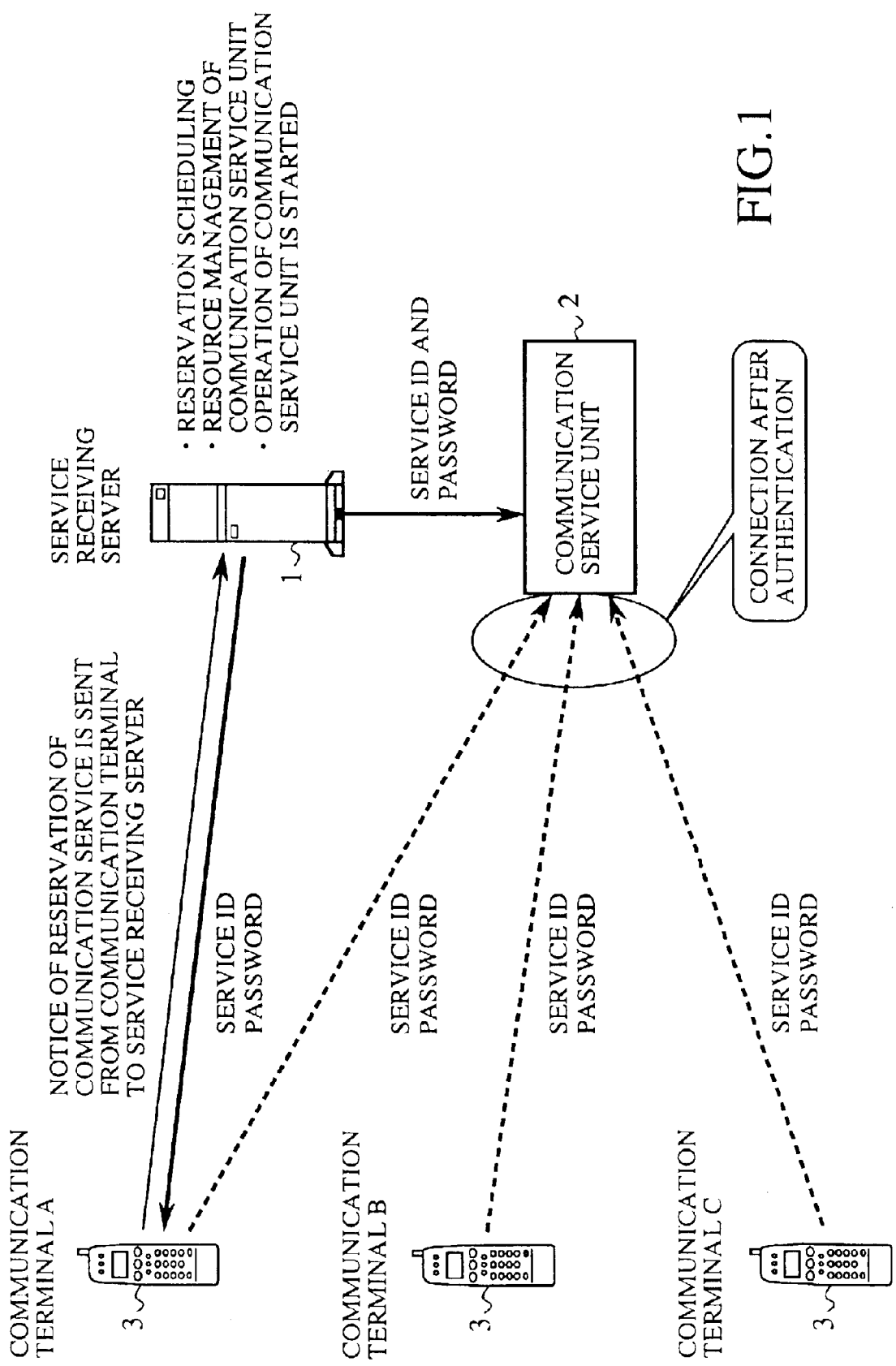
FIG. 1 is an explanatory view showing the configuration of a multi-point communication system and a signal flow in the multi-point communication system according to a first embodiment of the present invention.

FIG. 1 is an explanatory view showing the configuration of a multi-point communication system and a signal flow in the multi-point communication system according to a first embodiment of the present invention. In FIG. 1, 1 indicates a service receiving server (or a service receiving unit) such as a Web server for collecting and scheduling the reservation of a plurality of requests sent from a plurality of groups of communication terminals including a group of communication terminals 3A to 3C, performing the resource management of a communication service unit 2, issuing a service identifier (hereinafter, called a service ID) and a password to users of the communication terminals for each group and instructing the start of a multi-point communication service (a type of multi-point communication service or a plurality of types of multi-point communication services). 2 indicates the communication service unit for providing a type of multi-point communication service or a plurality of types of multi-point communication services for each of the groups of communication terminals including the group of communication terminals 3A to 3C. 3 indicates each of the communication terminals A to C (in this description, there are three communication terminals as one group for convenience of explanation. However, it is applicable that there be four communication terminals or more as one group). The communication terminals 3A to 3C of one group receive the multi-point communication service.

Here, each of the communication terminals A to C is connected with the service receiving server 1 through a network of wireless telephone lines or a network of wire telephone lines, each of the communication terminals A to C is connected with the communication service unit 2 through a network of wireless telephone lines or a network of wire telephone lines, and the service receiving server 1 and the communication service unit 2 are connected with each other through a network of wireless telephone lines or a network of wire telephone lines. In the multi-point communication system shown in FIG. 1, the service receiving server 1 and the communication service unit 2 are connected with each other through the network, and the service receiving server 1 and the communication service unit 2 are separately disposed in the communication system. However, it is applicable that the service receiving server 1 and the communication service unit 2 be integrally formed with each other. Also, in the first embodiment, the communication terminals 3A to 3C receive one multi-point communication service as a group of communication terminals. However, it is applicable that a plurality of groups of communication terminals exist in the communication system to receive one multi-point communication service in each group of communication terminals 3A to 3C.

Next, an operation will be described below.

In the service receiving server 1, when a request of a multi-point communication service sent from each of a plurality of groups of communication terminals including a group of the communication terminals 3A to 3C is received, the requests of the multi-point communication services sent from the groups of communication terminals are collected, a communication reservation scheduling for the requests of the multi-point communication services is performed according to the collection result of the requests in consideration of a communication resource state of the communication service unit 2. In this case, the requests of the multi-point communication services include a request for promptly performing a multi-point communication service and a reservation of a request for performing a multi-point communication service at a certain reservation time. Also, when the communication resource state of the communication service unit 2 indicates that the communication service unit 2 affords to perform a multi-point communication service or a plurality of multi-point communication services, it is preferred that the communication service unit 2 promptly performs all services of the multi-point communications requested by the groups of communication terminals without performing the communication reservation scheduling.

Thereafter, in the service receiving server 1, a service identifier (ID) indicating a multi-point communication service and a password peculiar to the group of the communication terminals 3A to 3C are sent to each of the communication terminals 3A to 3C of users from which a request of the multi-point communication service is sent to the service receiving server 1. In this case, the service ID and the passwords are specified in advance by the users who operate their communication terminals to specify the service ID and the passwords, or the service ID and the passwords are specified in advance by the service receiving server 1. Also, in cases where the communication terminals 3A to 3C receive the multi-point communication service as one group, the service receiving server 1 issues a plurality of passwords, which relate to the service ID and are the same as each other, to the communication terminals 3A to 3C respectively, or the service receiving server 1 issues a plurality of passwords, which differ from each other and relate to each other according to the service ID, to the communication terminals 3A to 3C respectively.

Thereafter, when a certain reservation time of the provision of a multi-point communication service for the group of communication terminals 3A to 3C comes, the service receiving server 1 sends the service ID and the common password (or the passwords), which have been already sent to the communication terminals 3A to 3C, to the communication service unit 2 according to the communication reservation scheduling set in the service receiving server 1 in consideration of the communication resource state of the communication service unit 2, and the service receiving server 1 instructs the start of the multi-point communication service.

Also, in the group of the communication terminals 3A to 3C from which a request of the multi-point communication service is sent, a connection with the communication service unit 2 through a wireless communication line or a wire communication line is performed. Thereafter, both the service ID and the password are, for example, sent from each of the communication terminals 3A to 3C to the communication service unit 2 according to a DTMF speech recognition method or an in-channel method such as CGI or JAVA.

Thereafter, when both the service ID and the password are sent from each of the communication terminals 3A to 3C to the communication service unit 2, the communication service unit 2 receives both the service ID and the password from each of the communication terminals 3A to 3C and authenticates both the service ID and the password sent from each of the communication terminals 3A to 3C. Thereafter, the communication service unit 2 obtains contents of the reservation of the request of the multi-point communication service, which is sent from the group of the communication terminals 3A to 3C to the service receiving server 1, from the service receiving server 1, and the communication service unit 2 judges whether or not it comes the reservation time to provide the multi-point communication service for the group of the communication terminals 3A to 3C. In cases where it comes the reservation time to provide the multi-point communication service for the group of the communication terminals 3A to 3C, the communication service unit 2 performs a connection with the group of the communication terminals 3A to 3C specified by the service ID. The communication terminals 3A to 3C specified by the service ID denote a group of the communication terminals receiving the multi-point communication service and have the passwords which are the same as each other or differ from each other while relating to each other. Also, in this case, the contents of the multi-point communication service provided for the communication terminals 3A to 3C are determined according to the service ID sent from the communication terminals 3A to 3C or the service receiving server 1 or are determined according to an instruction sent from the service receiving server 1. For example, a type of ordinary speech communication service, a type of data communication service, a type of audio and video communication service or the combination of those types of communication services are provided for the communication terminals 3A to 3C as a type of multi-point communication service or various types of multi-point communication services. Therefore, in cases where only one type of multi-point communication service is provided for the group of the communication terminals 3A to 3C, or in cases where various types of multi-point communication services provided for the group of the communication terminals 3A to 3C can be distinguished from each other in the service receiving server 1 or the communication service unit 2, the service ID is not required to identify the type of multi-point communication service or each of the various types of multi-point communication services provided for the group of the communication terminals 3A to 3C, and the type of multi-point communication service or the various types of multi-point communication services provided for the group of the communication terminals 3A to 3C can be sufficiently recognized in the communication service unit 2 by sending only the password from each communication terminal to the communication service unit 2. Also, regardless of whether a user can participate in a group of members receiving various types of multi-point communication services for pay or free, there is a case where the user can participate in the group of members without a password. In this case, no password is required of users, and the type of multi-point communication service or each of the various types of multi-point communication services provided for the group of the communication terminals 3A to 3C can be sufficiently recognized in the communication service unit 2 by sending only the service ID from each communication terminal to the communication service unit 2.

Accordingly, the communication terminals 3A to 3C can receive a type of multi-point communication service or various types of multi-point communication services to communicate with each other through the communication service unit 2.

As is described above, in the first embodiment, a service ID and a common password (or a plurality of passwords relating to each other) are determined for each group of communication terminals receiving a type of multi-point communication service (or various types of multi-point communication services), and the service ID and the password are assigned to each group of communication terminals receiving the multi-point communication service. Therefore, even though the communication terminals 3A to 3C of one group are connected with each other through the communication service unit 2 to receive the multi-point communication service, it is not required of users to register a plurality of telephone numbers of communication terminals of the users in advance, but it is only required of users to register the service ID and the password of the group. Accordingly, the reservation of the multi-point communication service can be simplified, and the convenience of the reservation for the users can be heightened.

Also, users of each group determine a service ID and a common password (or a plurality of passwords relating to each other) corresponding to a type of multi-point communication service (or various types of multi-point communication services), the service receiving server 1 distributes the service ID and the password to each of the communication terminals 3A to 3C of the group receiving the multi-point communication service, and names of the service ID and the password matching with either the purpose of the multi-point communication service or the personality of each user can be specified. Therefore, the users can easily keep in mind the service ID and the password in conformity with contents of the multi-point communication service, and the convenience of the multi-point communication service for the users can be heightened.

Embodiment 2

In the multi-point communication system of the first embodiment, the service receiving server 1 issues a service ID and a common password (or a plurality of passwords relating to each other) for each group of communication terminals receiving a type of multi-point communication service (or various types of multi-point communication services), the reservation of the multi-point communication service is simplified by using the service ID and the password, and the convenience of the reservation for the users can be heightened. Next, a multi-point communication system relating to the accounting of a charge for the multi-point communication service will be described according to a second embodiment.

Figure 2:
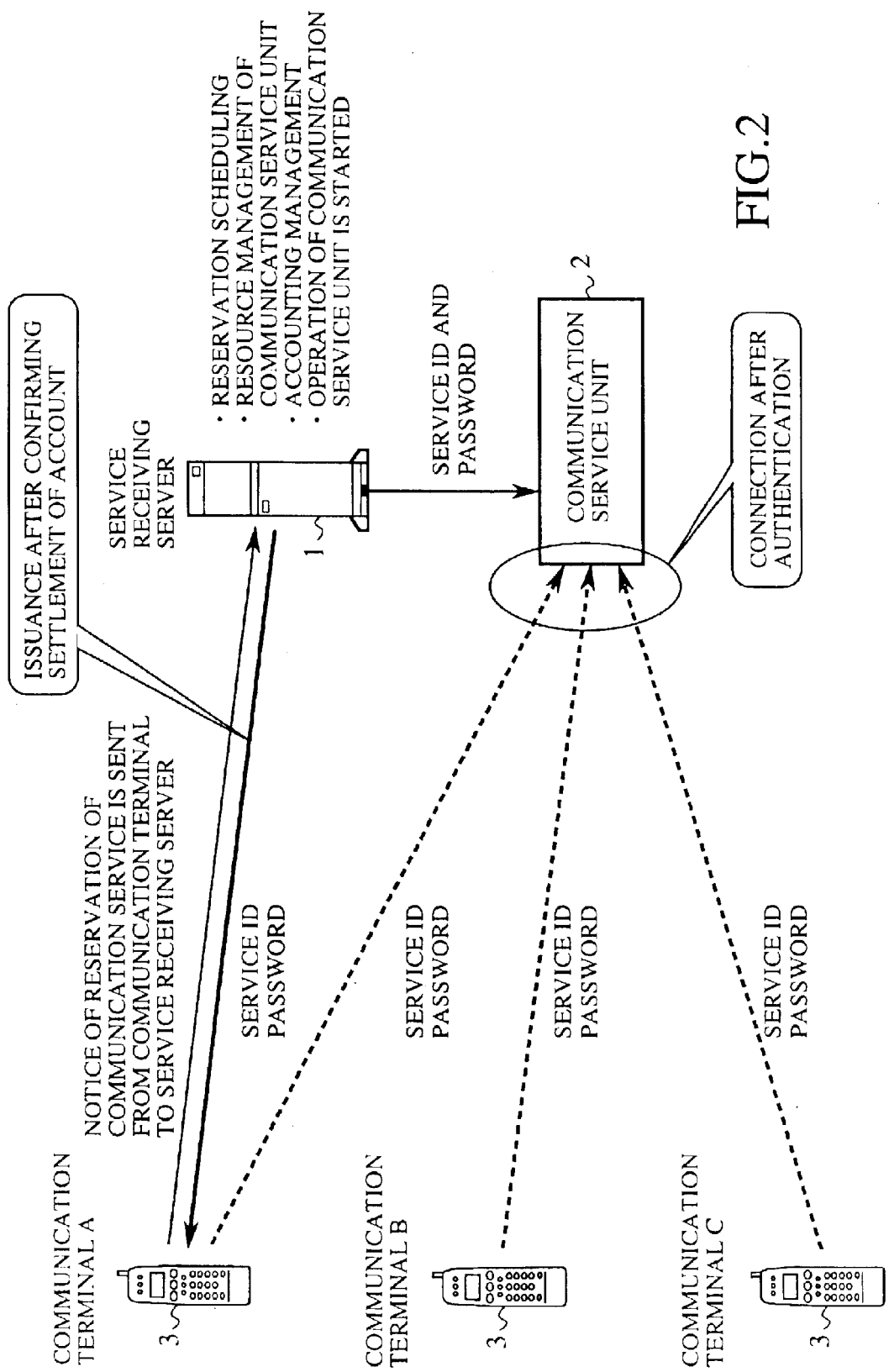
FIG. 2 is an explanatory view showing the configuration of a multi-point communication system and a signal flow in the multi-point communication system according to a second embodiment of the present invention.

FIG. 2 is an explanatory view showing the configuration of a multi-point communication system and a signal flow in the multi-point communication system according to a second embodiment of the present invention. In FIG. 2, 1 indicates a service receiving server (or a service receiving unit) for collecting and scheduling the reservation of a plurality of requests sent from a plurality of groups of communication terminals including a group of communication terminals 3A to 3C, performing the resource management of a communication service unit 2 and the accounting management, and instructing the start of the multi-point communication service (a type of multi-point communication service or a plurality of types of multi-point communication services). 2 indicates the communication service unit for providing a type of multi-point communication service or a plurality of types of multi-point communication services for each of the groups of communication terminals including the group of communication terminals 3A to 3C. 3 indicates each of the communication terminals A to C of one group receiving a type of multi-point communication service or various types of multi-point communication services.

Next, an operation will be described below.

In the same manner as the operation in the first embodiment, when the service receiving server 1 receives a request of a multi-point communication service from each of a plurality of groups of communication terminals including the group of the communication terminals 3A to 3C, the requests of the multi-point communication services are collected in the service receiving server 1, and a communication reservation scheduling for the requests of the multi-point communication services is performed in the service receiving server 1 according to the collection result of the requests in consideration of a communication resource state of the communication service unit 2.

Also, when or before the service receiving server 1 issues a service ID and a password to each of the communication terminals 3A to 3C of one group from which the request of the multi-point communication service is sent to the service receiving server 1, the service receiving server 1 confirms whether or not the users of the communication terminals 3A to 3C settle an account for the multi-point communication service. In other words, the service receiving server 1 confirms whether or not the users pay a charge for the multi-point communication service.

In cases where the service receiving server 1 can confirm the payment of a charge for the multi-point communication service, the service receiving server 1 issues the service ID and the password to each of the communication terminals 3A to 3C for which the service receiving server 1 can confirm the payment of a charge for the multi-point communication service. In contrast, in cases where the service receiving server 1 cannot confirm the payment of a charge for the multi-point communication service, the service receiving server 1 does not issue either the service ID or the password to each of the communication terminals 3A to 3C for which the service receiving server 1 cannot confirm the payment of a charge for the multi-point communication service.

Thereafter, in the same manner as the operation in the first embodiment, each of the communication terminals 3A to 3C receiving the service ID and the password performs a connection with the communication service unit 2 and receives a type of multi-point communication service or various types of multi-point communication services. In contrast, each of the communication terminals 3A to 3C not paying a charge for the multi-point communication service cannot receive the multi-point communication service.

Also, in another concept of the second embodiment, the service receiving server 1 sends both a service ID and a password relating to a request of the multi-point communication service sent from users to each of the communication terminals 3A to 3C of the users in advance regardless of whether each of the users pay a charge for the multi-point communication service. Thereafter, in cases where the service receiving server 1 can confirm that each of the users pays a charge for the multi-point communication service, the service receiving server 1 instructs the start of the multi-point communication service to the communication service unit 2. In another concept, the service receiving server 1 informs the communication terminals 3A to 3C that the service ID and the password sent in advance are available, and the service receiving server 1 permits that the multi-point communication service is provided for the communication terminals 3A to 3C of the users. In contrast, in cases where the service receiving server 1 cannot confirm that each of the users pays a charge for the multi-point communication service, the service receiving server 1 does not instruct the start of the multi-point communication service to the communication service unit 2. In another concept, the service receiving server 1 informs the communication terminals 3A to 3C that each of the service ID and the password sent in advance is unavailable.

As is described above, in the second embodiment, after the service receiving server 1 can confirm that the users of the communication terminals 3A to 3C settle an account for the multi-point communication service requested by the users, the service receiving server 1 provides the multi-point communication service for the users. Therefore, the service receiving server 1 can reliably collect charges from the users, and the unrighteous use of the multi-point communication service can be prevented.

Also, the service receiving server 1 performs the provision or no provision of the multi-point communication service by controlling the sending of the service ID and the password. Therefore, after the service receiving server 1 instructs the start of the multi-point communication service to the communication service unit 2, even though the payment of the users falls in shortage during the provision of the multi-point communication service, the password is made unavailable during the provision of the multi-point communication service. Accordingly, the accounting for the multi-point communication service can be correctly managed.

Embodiment 3

In the multi-point communication system of the second embodiment, after the recognition of the payment of a charge for the multi-point communication service, the multi-point communication service is provided for the users. Therefore, charges for the multi-point communication service can be reliably collected from the users, and the unrighteous use of the multi-point communication service can be prevented. Next, a multi-point communication system of a third embodiment will be described. In a conventional multi-point communication system, in cases where there is no free space in the communication resource of the communication service unit 2 when a group of users desire to reserve the provision of the multi-point communication service, even though a free space is obtained in the communication resource of the communication service unit 2 after the reservation operation, the resource is not assigned to the group of users according to the reservation operation preformed previously. However, in the multi-point communication system of the third embodiment, the resource is automatically assigned to the group of users according to the reservation operation preformed previously.

Figure 3:
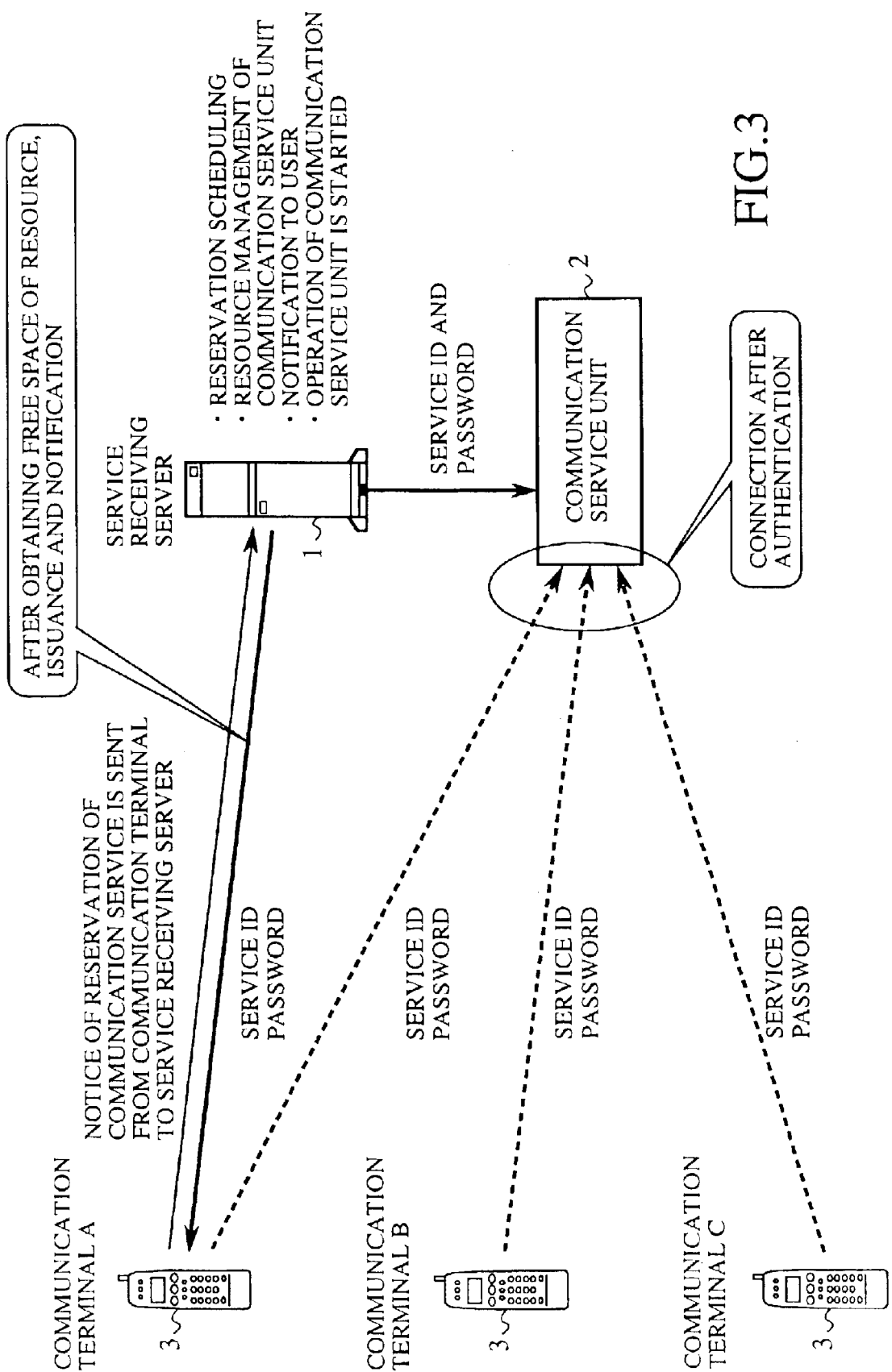
FIG. 3 is an explanatory view showing the configuration of a multi-point communication system and a signal flow in the multi-point communication system according to a third embodiment of the present invention.

FIG. 3 is an explanatory view showing the configuration of a multi-point communication system and a signal flow in the multi-point communication system according to the third embodiment of the present invention. In FIG. 3, 1 indicates a service receiving server (or a service receiving unit) for collecting and scheduling the reservation of a plurality of requests sent from a plurality of groups of communication terminals including a group of communication terminals 3A to 3C, performing the resource management of a communication service unit 2 and the notification to users of each group, and instructing the start of the multi-point communication service (a type of multi-point communication service or a plurality of types of multi-point communication services). 2 indicates the communication service unit for providing a type of multi-point communication service or a plurality of types of multi-point communication services for each of the groups of communication terminals including the group of communication terminals 3A to 3C. 3 indicates each of the communication terminals A to C of one group receiving a type of multi-point communication service or various types of multi-point communication services.

Next, an operation will be described below.

In the same manner as the operation in the first embodiment, when the service receiving server 1 receives a request of the multi-point communication service from each of a plurality of groups of communication terminals including the group of the communication terminals 3A to 3C, the requests of the multi-point communication services are collected in the service receiving server 1, and a communication reservation scheduling for the requests of the multi-point communication services is performed in the service receiving server 1 according to the collection result of the requests in consideration of a communication resource state of the communication service unit 2.

In this case, the service receiving server 1 of the third embodiment judges whether or not a free space exists in the communication resource of the communication service unit 2. In cases where no free space exists in the communication resource of the communication service unit 2, the service receiving server 1 notifies the communication terminals 3A to 3C sending the request of the multi-point communication service that no free space exists in the communication resource of the communication service unit 2, and the service receiving server 1 does not issue either a service ID or a password to the communication terminals 3A to 3C.

Also, the service receiving server 1 judges whether or not a request of waiting for a reservation of a request is included in a plurality of requests of the multi-point communication services. In cases where a request of waiting for a reservation of a request is included in a plurality of requests of the multi-point communication services, the service receiving server 1 stores a plurality of telephone numbers and a plurality of mail addresses of the communication terminals 3A to 3C, which send the request of waiting for a reservation of a request, in addition to the request of the multi-point communication service. In another concept of the third embodiment, in cases where no free space exists in the communication resource of the communication service unit 2, the service receiving server 1 notifies the communication terminals 3A to 3C sending the request of the multi-point communication service that no free space exists in the communication resource of the communication service unit 2, the service receiving server 1 issues a service ID and a password to the communication terminals 3A to 3C, and the service receiving server 1 notifies the communication terminals 3A to 3C that either each of the service ID or the password is not currently available and is made available when a free space is obtained in the communication resource of the communication service unit 2.

Thereafter, when a free space appropriate to contents of the multi-point communication service relating to the request of waiting for a reservation is obtained in the communication resource of the communication service unit 2, the service receiving server 1 issues a service ID and a plurality of passwords to the communication terminals 3A to 3C waiting for the multi-point communication service according to the telephone numbers or the mail addresses of the communication terminals 3A to 3C stored in advance and notifies the communication terminals 3A to 3C that a free space exists in the communication resource of the communication service unit 2. In another concept, the service receiving server 1 notifies the communication terminals 3A to 3C that the service ID and the password previously issued are available. Also, the service receiving server 1 sends the service ID and the common password (or the passwords) to the communication service unit 2 or sends a notice indicating the availability of both the service ID and the common password (or the passwords), which are previously sent, to the communication service unit 2. Also, if necessary, an instruction indicating the permission of the provision of the multi-point communication service is sent from the service receiving server 1 to the communication service unit 2.

Therefore, the notice of both the service ID and the password sent by the service receiving server 1 is received in the communication terminals 3A to 3C which send the request of the multi-point communication service including a request of waiting for a reservation.

Thereafter, in the same manner as in the first embodiment, the communication terminals 3A to 3C perform a connection with the communication service unit 2, or a call is sent from the communication service unit 2 to the communication terminals 3A to 3C so as to connect the communication service unit 2 and the communication terminals 3A to 3C. Therefore, the communication terminals 3A to 3C can receive the multi-point communication service to perform the multi-point communication among the communication terminals 3A to 3C of the group requesting the multi-point communication service.

As is described above, in the third embodiment, a request of the multi-point communication service including a request of waiting for a reservation is sent from the communication terminals 3A to 3C to the service receiving server 1. Therefore, even though the communication terminals 3A to 3C cannot receive the multi-point communication service due to the shortage of the communication resource of the communication service unit 2, when a free space is obtained in the communication resource of the communication service unit 2, the service receiving server 1 can take the request of waiting for a reservation, and the resource of the communication service unit 2 can be efficiently used.

Also, each user is not required to confirm whether or not a free space exists in the communication resource of the communication service unit 2. Therefore, the convenience of the multi-point communication service for the users can be heightened.

Embodiment 4

In the multi-point communication system of the third embodiment, in cases where no free space exists in the communication resource of the communication service unit 2 when a group of users desire to reserve a request of the multi-point communication service, a space of the communication resource is again assigned to the group of users when the space of the communication resource is obtained in the communication service unit 2. Therefore, the communication resource is efficiently used. Next, a multi-point communication system of a fourth embodiment will be described. In this multi-point communication system, a notice of a reservation time of the multi-point communication service is sent to a group of users.

Figure 4:
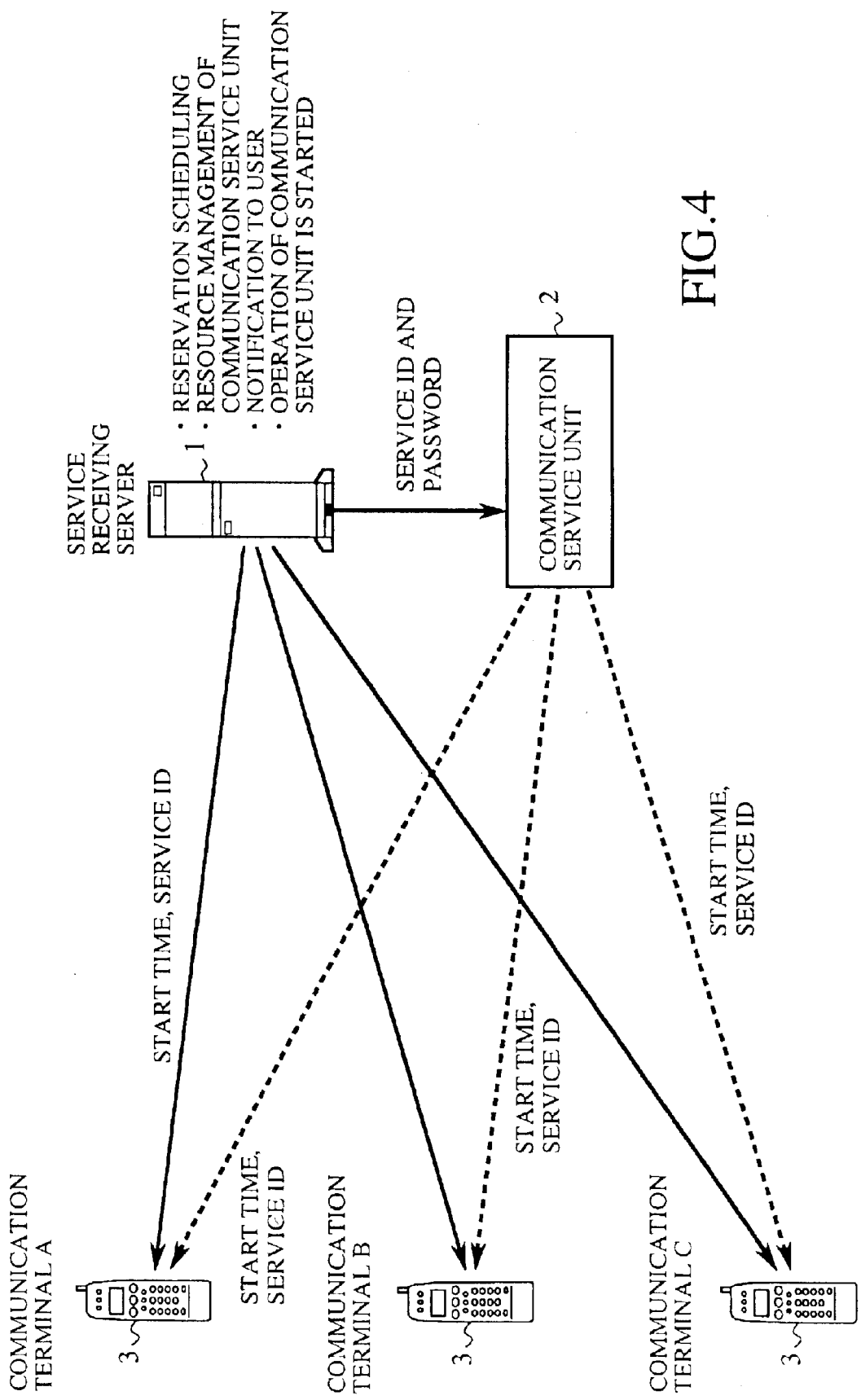
FIG. 4 is an explanatory view showing the configuration of a multi-point communication system and a signal flow in the multi-point communication system according to a fourth embodiment of the present invention.

FIG. 4 is an explanatory view showing the configuration of a multi-point communication system and a signal flow in the multi-point communication system according to the fourth embodiment of the present invention. In FIG. 4, 1 indicates a service receiving server (or a service receiving unit) for collecting and scheduling the reservation of a plurality of requests sent from a plurality of groups of communication terminals including a group of communication terminals 3A to 3C, performing the resource management of a communication service unit 2 and the notification to users of each group, and instructing the start of the multi-point communication service (a type of multi-point communication service or a plurality of types of multi-point communication services). 2 indicates the communication service unit for providing a notice for each of the communication terminals 3A to 3C of users and providing a type of multi-point communication service or a plurality of types of multi-point communication services for each of the groups of communication terminals including the group of communication terminals 3A to 3C. 3 indicates each of the communication terminals A to C of one group receiving a type of multi-point communication service or various types of multi-point communication services.

Next, an operation will be described below.

In the same manner as the operation in the first embodiment, when the service receiving server 1 receives a request of the multi-point communication service from each of a plurality of groups of communication terminals including the group of the communication terminals 3A to 3C, the requests of the multi-point communication services are collected in the service receiving server 1, and a communication reservation scheduling for the requests of the multi-point communication services is performed in the service receiving server 1 according to the collection result of the requests in consideration of a communication resource state of the communication service unit 2.

Thereafter, in the service receiving server 1, a service ID and a password are sent to each of the communication terminals 3A to 3C of users from which the request of the multi-point communication service is sent to the service receiving server 1 or for which the multi-point communication service is provided. In this case, the service ID and the password are specified in advance by each user who operates his or her communication terminal to specify the service ID and the password, or the service ID and the password are specified in advance by the service receiving server 1. This operation is the same as that in the first embodiment.

Thereafter, in the fourth embodiment, the service receiving server 1 judges according to the communication reservation scheduling set by the service receiving server 1 in consideration of the communication resource state of the communication service unit 2 whether or not a specific time just before a reservation time by a certain time period comes. The multi-point communication service is planned to be provided for a certain group of communication terminals at the reservation time. When the specific time just before the reservation time of the multi-point communication service by the certain time period comes, the service receiving server 1 or the communication service unit 2 again notifies one group of the communication terminals 3A to 3C, from which a request of the multi-point communication service is sent to the service receiving server 1 or for which the multi-point communication service is provided according to a request of the multi-point communication service, of a start time of the multi-point communication service or the service ID.

Therefore, when the reservation time comes, one group of the communication terminals 3A to 3C, from which a request of the multi-point communication service is sent to the service receiving server 1 or for which the multi-point communication service is provided according to a request of-the multi-point communication service, performs a connection with the communication service unit 2, and the communication terminals 3A to 3C of one group can receive the multi-point communication service to communicate with each other.

As is described above, in the fourth embodiment, because the service receiving server 1 or the communication service unit 2 confirms the provision of the multi-point communication service at the specific time just before the reservation time of the multi-point communication service by the certain time period, a probability that the users of the group forget to receive the multi-point communication service can be reduced.

Also, even though a request of the multi-point communication service is erroneously sent from the group of the communication terminals 3A to 3C to the service receiving server 1 so as to erroneously register the request of the multi-point communication service in the service receiving server 1, because the service receiving server 1 or the communication service unit 2 notifies the group of the communication terminals 3A to 3C of a start time of the multi-point communication service, the users of the group of the communication terminals 3A to 3C can be aware of the erroneous request according to contents of the notice. Accordingly, the users can revise or cancel the reservation of the multi-point communication service erroneously registered, and the users can prevent a charge for the multi-point communication service from being generated in vain.

Also, in cases where the users cancel or revise the reservation of the multi-point communication service registered in the service receiving server 1, the users can know a change of the resource before the start of the multi-point communication service. Accordingly, the resource of the communication service unit 2 can be efficiently used.

Embodiment 5

In the multi-point communication system of the fourth embodiment, the notice of a reservation time of the provision of the multi-point communication service reserved by a group of users is sent to the group of users. Next, a multi-point communication system of a fifth embodiment will be described. In this multi-point communication system, an authorized limit of rights of the multi-point communication service provided for each user differs from that provided for another user.

Figure 5:
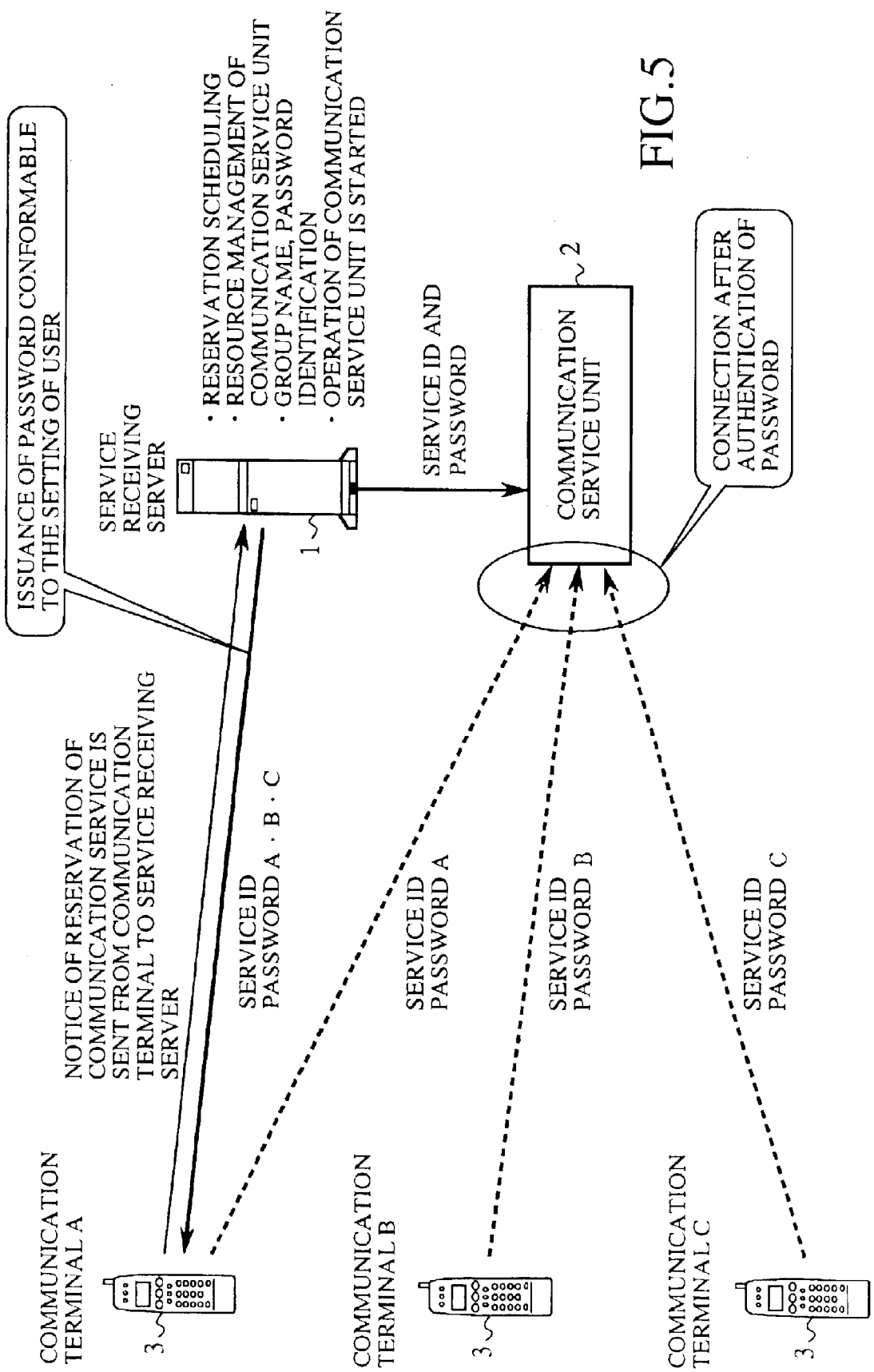
FIG. 5 is an explanatory view showing the configuration of a multi-point communication system and a signal flow in the multi-point communication system according to a fifth embodiment of the present invention.

FIG. 5 is an explanatory view showing the configuration of a multi-point communication system and a signal flow in the multi-point communication system according to the fifth embodiment of the present invention. In FIG. 5, 1 indicates a service receiving server (or a service receiving unit) for collecting and scheduling the reservation of a plurality of requests sent from a plurality of groups of communication terminals including a group of communication terminals 3A to 3C, performing the resource management of a communication service unit 2, the acknowledgment of a service ID and a plurality of passwords different from each other, and instructing the start of the multi-point communication service (a type of multi-point communication service or a plurality of types of multi-point communication services). 2 indicates the communication service unit for providing a notice for each of the communication terminals 3A to 3C of users and providing a type of multi-point communication service or a plurality of types of multi-point communication services for each of the groups of communication terminals including the group of communication terminals 3A to 3C. 3 indicates each of the communication terminals A to C of one group receiving a type of multi-point communication service or various types of multi-point communication services.

Next, an operation will be described below.

In the same manner as the operation in the first embodiment, when the service receiving server 1 receives a request of the multi-point communication service from each of a plurality of groups of communication terminals including the group of the communication terminals 3A to 3C, the requests of the multi-point communication services are collected in the service receiving server 1, and a communication reservation scheduling for the requests of the multi-point communication services is performed in the service receiving server 1 according to the collection result of the requests in consideration of a communication resource state of the communication service unit 2. Thereafter, in the service receiving server 1, both a service ID and a password are sent to each of the communication terminals 3A to 3C of users from which the request-of the multi-point communication service is sent to the service receiving server 1 or for which the multi-point communication service is provided. In this case, the service ID and the password are specified in advance by each user, or the service ID and the password are specified in advance by the service receiving server 1. This operation is the same as that in the first embodiment.

In detail, in the service receiving server 1 of the fifth embodiment, a plurality of passwords different from each other are respectively issued to the communication terminals 3A to 3C of the users which send a plurality of requests of the multi-point communication service to the service receiving server 1 and receive the same type of multi-point communication service. In this case, each password of the communication terminal is determined according to both a communication channel capacity of the communication terminal set by the corresponding user and an authorized limit of rights of the multi-point communication service provided for the user. For example, as shown in FIG. 5, the communication terminals 3A to 3C of one group receive the same type of multi-point communication service, the service receiving server 1 issues a password "A*B*C" to the communication terminal 3A, the service receiving server 1 issues a password "B" to the communication terminal 3B, and the service receiving server 1 issues a password "C" to the communication terminal 3C.

Thereafter, the service receiving server 1 sends information of the service ID and the passwords issued to the group of the communication terminals 3A to 3C to the communication service unit 2 to permit the provision of the multi-point communication service for the group.

Thereafter, the communication service unit 2 authenticates the service ID and the password sent from each of the communication terminals 3A to 3C according to the service ID and the passwords sent from the service receiving server 1. In cases where it is possible to provide the multi-point communication service for the group of the communication terminals 3A to 3C, the communication service unit 2 performs a connection with the group of the communication terminals 3A to 3C receiving the multi-point communication service, and the communication service unit 2 provides each communication terminal a type of multi-point communication service corresponding to both the communication channel capacity of the communication terminal and the authorized limit of rights possessed by the user of the communication terminal. Here, because each the communication terminal receives the type of multi-point communication service corresponding to both the communication channel capacity of the communication terminal and the authorized limit of rights possessed by the user of the communication terminal, even though the multi-point communication service is provided for the group of the communication terminals 3A to 3C, the right of speaking (or the right of data transmission), the upper limit of the number of speaking actions (or the upper limit of the number of data transmission actions) and a degree of priority in the right of speaking (or a degree of priority in the right of data transmission) are, for example, determined for each communication terminal.

As is described above, in the fifth embodiment, because the password is determined according to both the communication channel capacity and the authorized limit of rights for each communication terminal, in the multi-point communication service performed among the communication terminals of one group, the authorized limit of rights can be easily determined for each user, and the multi-point communication service can be provided for each communication terminal according to the communication channel capacity of the communication terminal.

Embodiment 6

In the multi-point communication system of the fifth embodiment, the authorized limit of rights in the multi-point communication service is determined for each user. Next, a multi-point communication system according to a sixth embodiment will be described. In this multi-point communication system, an input operation of a telephone number of each communication terminal is simplified, and each communication terminal is automatically connected with the communication service unit 2.

Figure 6:
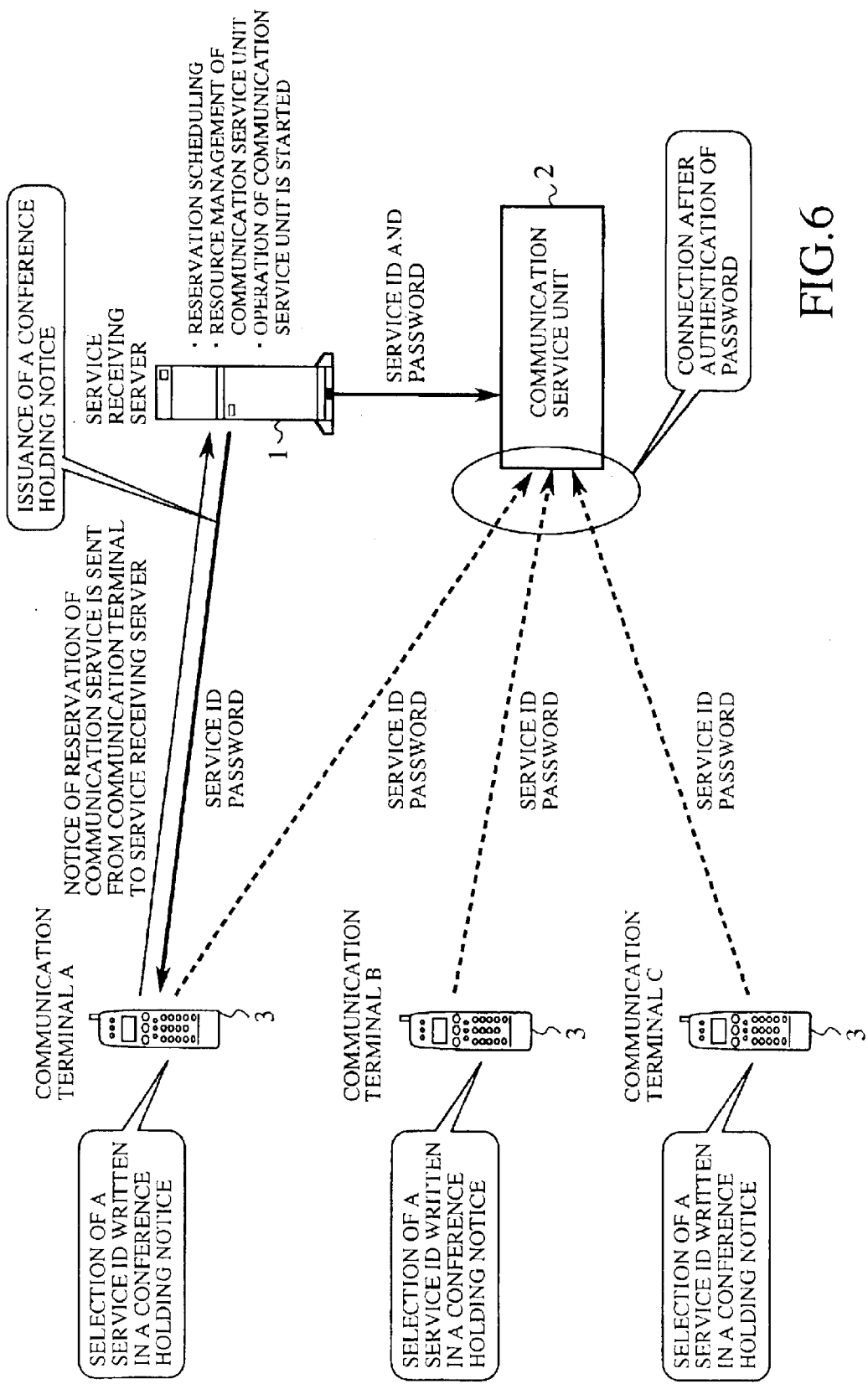
FIG. 6 is an explanatory view showing the configuration of a multi-point communication system and a signal flow in the multi-point communication system according to a sixth embodiment of the present invention.

FIG. 6 is an explanatory view showing the configuration of a multi-point communication system and a signal flow in the multi-point communication system according to the sixth embodiment of the present invention. In FIG. 6, 1 indicates a service receiving server (or a service receiving unit) for collecting and scheduling the reservation of a plurality of requests sent from a plurality of groups of communication terminals including a group of communication terminals 3A to 3C, performing the resource management of a communication service unit 2 and instructing the start of the multi-point communication service (a type of multi-point communication service or a plurality of types of multi-point communication services). 2 indicates the communication service unit for providing a notice for each of the communication terminals 3A to 3C of users and providing a type of multi-point communication service or a plurality of types of multi-point communication services for each of the groups of communication terminals including the group of communication terminals 3A to 3C. 3 indicates each of the communication terminals A to C of one group receiving a type of multi-point communication service or various types of multi-point communication services.

Next, an operation will be described below.

In the same manner as the operation in the first embodiment, when the service receiving server 1 receives a request of the multi-point communication service from each of a plurality of groups of communication terminals including the group of the communication terminals 3A to 3C, the requests of the multi-point communication services are collected in the service receiving server 1, and a communication reservation scheduling for the requests of the multi-point communication services is performed in the service receiving server 1 according to the collection result of the requests in consideration of a communication resource state of the communication service unit 2. Thereafter, in the service receiving server 1, both a service ID and a password are sent to each of the communication terminals 3A to 3C of users from which the request of the multi-point communication service is sent to the service receiving server 1. In this case, the service ID and the password are specified in advance by each user, or the service ID and the password are specified in advance by the service receiving server 1. This operation is the same as that in the first embodiment.

In this case, in the sixth embodiment, the service receiving server 1 assigns a call-in address to the communication service unit 2 for each service ID (that is, for each type of multi-point communication service), and the service receiving server 1 issues a text produced according to a hypertext markup language (HTML), a password and a service ID written in a conference holding notice according to the function of CGI or JAVA as an example to each of the communication terminals 3A to 3C from which a request of the multi-point communication service is sent to the service receiving server 1 or for which the multi-point communication service is provided. Therefore, the service ID is displayed on a screen of a displaying means (not shown) disposed in each of the communication terminals 3A to 3C. When a user of each of the communication terminals 3A to 3C selects either an area of the screen, on which the service ID is displayed, or an area of the screen corresponding to the service ID, the call-in address assigned to the communication service unit 2 is automatically used in each of the communication terminals 3A to 3C so as to connect each of the communication terminals 3A to 3C with the communication service unit 2.

Therefore, each of the communication terminals 3A to 3C receives the password and the service ID written in the conference holding notice, and the user of each communication terminal selects either an area of the screen, on which the service ID is displayed, or an area of the screen corresponding to the service ID. In this case, each communication terminal is automatically connected with the communication service unit 2 according to a call sent to the call-in address of the communication service unit 2, and the password is sent from each communication terminal to the communication service unit 2.

Thereafter, in the same manner as in the first embodiment, the communication service unit 2 collates the password sent from each of the communication terminals 3A to 3C with the password sent from the service receiving server 1, the communication service unit 2 authenticates each of the communication terminals 3A to 3C, and the communication service unit 2 provides the multi-point communication service for each of the communication terminals 3A to 3C.

As is described above, in the sixth embodiment, the service receiving server 1 assigns the call-in address to the communication service unit 2 and issues the password and the service ID written in the conference holding notice or the like to each of the communication terminals 3A to 3C, each of the communication terminals 3A to 3C receives the password and the service ID written in the conference holding notice, each of the communication terminals 3A to 3C selects an area of the conference holding notice displayed on the screen, each of the communication terminals 3A to 3C automatically sends a call to the assigned call-in address of the communication service unit 2, and each of the communication terminals 3A to 3C is connected with the communication service unit 2. Therefore, each user is not troublesome to perform the input operation to a connection address of the communication service unit 2, and the convenience of the multi-point communication service for each user can be heightened.

INDUSTRIAL APPLICABILITY

As is described above, a multi-point communication system and a multi-point communication method according to the present invention are appropriate to system and method in which the multi-point communication service is provided for a group of communication terminals, the operation of each communication terminal of the group is simplified, and the convenience of the multi-point communication service for each user is heightened.

What is claimed is:

1. A multi-point communication system, comprising a communication service unit for providing a type of multi-point communication service or a plurality of types of multi-point communication services for a single communication terminal or a plurality of communication terminals, characterized in that the multi-point communication system further comprises a service receiving unit for receiving a request of one type of multi-point communication service from the single communication terminal or the communication terminals, issuing both a service identifier corresponding to the type of multi-point communication service and a password corresponding to a communication terminal group receiving the type of multi-point communication service to the single communication terminal or each of the communication terminals requesting the type of multi-point communication service, and outputting the service identifier and the password or the passwords to the communication service unit, wherein the service receiving unit receives a request of a type of multi-point communication service from an arbitrary communication terminal denoting the single communication terminal or selected from among the communication terminals, the communication service unit receives the service identifier indicating the type of multi-point communication service and the password of the arbitrary communication terminal from the arbitrary communication terminal, the communication service unit confirms whether or not the password received from the arbitrary communication terminal agrees with the password of the arbitrary communication terminal output from the service receiving unit, and the communication service unit provides the type of multi-point communication service indicated by the service identifier for the arbitrary communication in a case where the password received from the arbitrary communication terminal agrees with the password output from the service receiving unit.

2. A multi-point communication system according to claim 1, wherein the service receiving unit is connected with the communication service unit through a network.

3. A multi-point communication system according to claim 1, wherein the request of the type of multi-point communication service received in the service receiving unit includes a name of a group of communication terminals performing a multi-point communication according to the type of multi-point communication service.

4. A multi-point communication system according to claim 1, wherein the service identifier or the password sent from the arbitrary communication terminal to the communication service unit is arbitrarily selected by a user of the arbitrary communication terminal.

5. A multi-point communication system according to claim 1, wherein the service receiving unit outputs an instruction indicating the start of the type of multi-point communication service to the communication service unit after the service receiving unit confirms that a user of the arbitrary communication terminal receiving the multi-point communication service pays a charge for the multi-point communication service, and the service receiving unit permits the communication service unit to provide the type of multi-point communication service for the user of the arbitrary communication terminal.

6. A multi-point communication system according to claim 1, wherein the service receiving unit outputs an instruction, which indicates that the password of the arbitrary communication terminal receiving the type of multi-point communication service is available, to the communication service unit after the service receiving unit confirms that a user of the arbitrary communication terminal receiving the type of multi-point communication service pays a charge for the type of multi-point communication service, and the service receiving unit permits the communication service unit to provide the type of multi-point communication service for the user of the arbitrary communication terminal.

7. A multi-point communication system according to claim 1, wherein a resource of the communication service unit is short when the service receiving unit receives the request of the type of multi-point communication service from the arbitrary communication terminal, the provision of the type of multi-point communication service becomes possible at a specific time because a free space is obtained in the resource of the communication service unit, and the service receiving unit notifies the arbitrary communication terminal requesting the type of multi-point communication service at the specific time that the provision of the type of multi-point communication service is possible.

8. A multi-point communication system according to claim 1, wherein a resource of the communication service unit is short when the service receiving unit receives the request of the type of multi-point communication service from the arbitrary communication terminal, the provision of the type of multi-point communication service becomes possible at a specific time because a free space is obtained in the resource of the communication service unit, and the service receiving unit sends an instruction to the communication service unit at the specific time to make the arbitrary communication terminal requesting the type of multi-point communication service connect with the communication service unit.

9. A multi-point communication system according to claim 1, wherein the service receiving unit is automatically connected with the arbitrary communication terminal, for which the type of multi-point communication service is provided, before a service providing time when the service providing time is coming, and the service receiving unit sends a notice of the provision of the type of multi-point communication service to the arbitrary communication terminal.

10. A multi-point communication system according to claim 1, wherein the service receiving unit issues a password conformable to a communication capacity of one communication terminal or an authorized limit of rights given to one communication terminal to the communication terminal for each communication terminal, and the communication service unit provides a type of multi-point communication service or a plurality of types of multi-point communication services conformable to the communication capacity of each communication terminal or the authorized limit of rights given to each communication terminal according to the password of the communication terminal.

11. A multi-point communication system according to claim 1, wherein the service receiving unit specifies a call-in address of the communication service unit for each service identifier and notifies the arbitrary communication terminal of the call-in addresses, the arbitrary communication terminal selects one service identifier notified by the service receiving unit to automatically send a call to the corresponding call-in address of the communication service unit and to be connected with the communication service unit, and the service receiving unit notifies the communication service unit of the password sent to the arbitrary communication terminal.

12. A multi-point communication method, comprising the step of providing a type of multi-point communication service or a plurality of types of multi-point communication services for a single communication terminal or a plurality of communication terminals, characterized in that the multi-point communication method further comprises the steps of;

receiving a request of a type of multi-point communication service from the single communication terminal or the communication terminals;

issuing a password or a service identifier corresponding to a communication terminal group receiving the type of multi-point communication service to the single communication terminal or each of the communication terminals requesting the type of multi-point communication service; and providing the type of multi-point communication service for an arbitrary communication terminal denoting the single communication terminal or selected from among the communication terminals according to the password or the service identifier sent from the arbitrary communication terminal in a case where the service identifier indicating a request of the type of multi-point communication service and the password are received from the arbitrary communication terminal.

\* \* \* \* \*